United States Patent
Toillon et al.

(10) Patent No.: US 10,187,365 B2
(45) Date of Patent: Jan. 22, 2019

(54) METHOD FOR EXCHANGING NUMERICAL DATA FRAMES AND ASSOCIATED COMMUNICATION SYSTEM

(71) Applicant: THALES, Courbevoie (FR)

(72) Inventors: Patrice Georges Paul Toillon, Velizy Villacoublay (FR); Paul Marie Boivin-Champeaux, Velizy Villacoublay (FR); David José Faura, Velizy Villacoublay (FR); Michael André Templier, Velizy Villacoublay (FR); William Terroy, Velizy Villacoublay (FR)

(73) Assignee: THALES, Courbevoie (FR)

( * ) Notice: Subject to any disclaimer, the term of this patent is extended or adjusted under 35 U.S.C. 154(b) by 139 days.

(21) Appl. No.: 14/963,771

(22) Filed: Dec. 9, 2015

(65) Prior Publication Data
US 2016/0173472 A1    Jun. 16, 2016

(30) Foreign Application Priority Data

Dec. 10, 2014 (FR) ..................................... 14 02808

(51) Int. Cl.
*H04L 1/22* (2006.01)
*H04L 29/06* (2006.01)
(Continued)

(52) U.S. Cl.
CPC ................ *H04L 63/08* (2013.01); *H04L 1/22* (2013.01); *H04L 67/12* (2013.01); *H04L 1/0061* (2013.01);
(Continued)

(58) Field of Classification Search
CPC . H04L 63/08; H04L 1/22; H04L 67/12; H04L 12/6418; H04L 43/12; H04L 63/10;
(Continued)

(56) References Cited

U.S. PATENT DOCUMENTS

| 8,136,152 B2 * | 3/2012 | Balissat | H04L 63/0209 |
| | | | 726/15 |
| 8,910,241 B2 * | 12/2014 | Pollutro | G06F 21/31 |
| | | | 713/176 |

(Continued)

FOREIGN PATENT DOCUMENTS

EP        2800319 A1    11/2014

OTHER PUBLICATIONS

Mesh-Based Content Routing using XML, Snoeren et al., 2001 ACM ISBN 1-58113o389-8-1/01/10.*
(Continued)

*Primary Examiner* — Minh Dinh
*Assistant Examiner* — Shu C Gao
(74) *Attorney, Agent, or Firm* — Troutman Sanders LLP

(57) ABSTRACT

The present invention relates to a method that may be used in a digital data communication system comprising a communication network constituted of a plurality of nodes, and a plurality of subscriber equipment units each connected to a node, includes:
 a transmission phase ($P_1$) including the steps of limiting of the size of each frame to be transmitted, adding identification-authentication credentials, and transmitting the frames with a predetermined transmission interval; and
 a transmission phase ($P_2$) including the steps of monitoring-checking for compliance with the input conditions; removal of each frame that is non-compliant, replicating each frame that is compliant, monitoring-checking for compliance with the output conditions, removing each frame that is non-compliant, transmitting each frame that is compliant, and recording and storing of the identification-authentication credential for each frame transmitted.

17 Claims, 4 Drawing Sheets

(51) Int. Cl.
*H04L 29/08* (2006.01)
*H04L 1/00* (2006.01)
*H04L 1/18* (2006.01)

(52) U.S. Cl.
CPC .... *H04L 1/1887* (2013.01); *H04L 2001/0096* (2013.01)

(58) Field of Classification Search
CPC ............... H04L 63/0227; H04L 63/067; H04L 63/0838; H04L 63/104; H04L 63/164; H04L 69/16; H04L 69/166; G06F 21/31; G06F 21/335; G06F 21/6218; G06F 2221/2101; G06F 2221/2117; G06F 2221/211; G06F 12/1081; H04N 19/36; H04N 19/132; H04N 19/164; H04N 19/187; H04N 19/33; H04N 19/31
See application file for complete search history.

(56) References Cited

U.S. PATENT DOCUMENTS

| | | | | |
|---|---|---|---|---|
| 9,591,316 | B2* | 3/2017 | Bar Bracha | H04N 19/36 |
| 9,781,114 | B2* | 10/2017 | Pollutro | H04L 63/10 |
| 9,806,907 | B2* | 10/2017 | Nachum | H04L 12/6418 |
| 2006/0075067 | A1* | 4/2006 | Blackmore | H04L 69/16 |
| | | | | 709/217 |
| 2007/0166051 | A1* | 7/2007 | Sebayashi | H04L 63/1441 |
| | | | | 398/177 |
| 2009/0276842 | A1* | 11/2009 | Yevmenkin | H04L 67/1002 |
| | | | | 726/13 |
| 2010/0128619 | A1* | 5/2010 | Shigei | H04L 12/1877 |
| | | | | 370/252 |
| 2011/0016316 | A1* | 1/2011 | Amir | H04L 63/12 |
| | | | | 713/168 |
| 2013/0094515 | A1* | 4/2013 | Gura | H04L 47/00 |
| | | | | 370/419 |
| 2014/0036735 | A1 | 2/2014 | Hall et al. | |
| 2014/0079059 | A1* | 3/2014 | Amir | H04L 12/18 |
| | | | | 370/390 |
| 2014/0204941 | A1* | 7/2014 | Bestler | G06F 17/30 |
| | | | | 370/390 |
| 2016/0080279 | A1* | 3/2016 | Tan | H04W 40/20 |
| | | | | 370/328 |

OTHER PUBLICATIONS

Ian Land and Jeff Elliott: "Architecting ARINC 664, Part 7 (AFDX) Solutions", Application Note: VIRTEX-4 and VIRTEX-5 FPGAS, No. version 1.0.1, 22 mai 2009 (May 22, 2009), pp. 1-25, Extrait de l'Internet: URL:http://www.xilinx.com/support/documentation/application_notes/xappl130.pdf.

Jorg Sommer et al: "Ethernet—A Survey on its Fields of Application", IEEE Communications Surveys and Tutorials, Institute of Electrical and Electronics Engineers, US, vol. 12, No. 2, 1 avril 2010 (Apr. 1, 2010), pp. 263-284.

French Search Report dated Oct. 5, 2015 issued in corresponding French Patent Application No. 1402808.

* cited by examiner

METHOD FOR EXCHANGING NUMERICAL DATA FRAMES AND ASSOCIATED COMMUNICATION SYSTEM

CROSS-REFERENCE TO RELATED APPLICATION

The present application claims priority to French Application No. 1402808, filed Dec. 10, 2014. This application is incorporated herein by reference in its entirety.

FIELD OF THE INVENTION

The present invention relates to a method for exchanging numerical or digital data frames.

More particularly, the invention relates to such a frame exchange method in a data communication system for communicating digital data for avionics applications including at least:
- a communication network constituted of a plurality of communication nodes interconnected to each other by transmission means including physical and/or wireless media in order to transmit the frames and comprising a plurality of external input and/or output ports connecting this node to at least one other node, with at least some of the nodes comprising in addition at least one internal input and/or output port connecting this node to a subscriber equipment unit, each communication node making it possible to transmit the frames originating from one of the external and/or internal input ports to at least one of the external and/or internal output ports;
- a plurality of subscriber equipment units, each subscriber equipment unit being connected to a communication node via at least one internal port and capable of transmitting and/or receiving the frames within the and/or originating from the communication network via this communication node.

BACKGROUND OF THE INVENTION

The present invention also relates to a communication system that operationally implements this method.

Various different data exchange methods for exchanging digital data frames in a communication network exist in the state of the art.

In a general manner, these methods include different frame exchange techniques for exchanging data frames that provide the ability in particular to minimise the loss of data during these exchanges. For example, such a loss can occur when one or more nodes of communication are not operational or when the physical pathways or wireless communication means that connect these nodes, do not allow for a valid transmission of frames.

The problem of loss of data during these transmissions is treated with special attention in avionics applications. Indeed, such a loss can lead to the malfunctioning of an avionics system that would call into question and undermine the overall safety and security of the aircraft using this avionics system.

In order to remedy this problem, it has in particular been suggested to make use of communication networks including redundant pathways and/or communication nodes.

Thus, for example, for the networks with loop topology, a well known technique involves the connecting of communication nodes by means of redundant physical pathways, such as for example connection in interconnected (cable) braids. Such a connection technique consists in connecting by means of a direct link, each node in the loop to the neighboring nodes of each immediate neighboring node of this node.

This then makes it possible to ensure the transmission of frames in the network in the event of the malfunctioning of one of the immediate neighboring nodes of this node.

Another technique that is also well known is the use of complementary physical pathways known as "by-pass" that operationally implement dedicated active components referred to as "by-passes" that provide the ability to directly connect one communication node to another node in the loop that is not its immediate neighbour.

In all cases of connection by redundant physical pathways, the management of transmission of frames traversing along these pathways, is required. This transmission management should provide the ability to avoid in particular collisions between the frames and to ensure the proper routing of each frame using a redundant pathway.

In the currently existing solutions, this management proves to be complex and difficult to establish and implement in existing networks. In addition, generally speaking, this management depends on the topology of the network.

SUMMARY OF THE INVENTION

The goal of the present invention is to provide a method for exchanging digital or numerical data frames that provides the ability to ensure effective management of the exchange of frames via redundant physical pathways in a manner that is particularly simple, robust and easily adaptable to any network topology, and this without having to make use of dedicated active components known as "by-passes". This method presents a systematic approach that is controlled with a simple and predefined law.

To this end, the object of the invention is related to a frame exchange method for exchanging data frames comprising at least one transmission phase for transmitting of frames operationally implemented by at least one subscriber equipment unit and including the following steps:
- limiting of the size of each frame to be transmitted by a predetermined value for maximum size;
- addition of identification-authentication credentials in each frame to be transmitted in order to develop a duplicate frame; and
- transmission of the frames to be transmitted with a transmission interval that is predetermined and defined mathematically on the basis of the topology of the network, to at least one internal input port of the corresponding communication node; and
- a transmission phase for transmitting of frames operationally implemented by at least one communication node and including the following steps:
- monitoring-checking for compliance, of each frame received via an external or internal input port, with the predetermined input conditions;
- removal of each frame that is not in compliance with the input conditions;
- replication of each frame that is in compliance with the input conditions in order to create a replicated frame for each external or internal output port;
- monitoring-checking for compliance, of each replicated frame, with the predetermined output conditions;
- removal of each replicated frame that is not in compliance with the output conditions;
- transmission of each replicated frame that is in compliance with the output conditions via the corresponding external or internal output port;

recording and storing of the identification-authentication credential for each frame that is transmitted and compliant with the input conditions and the output conditions.

According to specific embodiments of the invention, the method consists of one or more of the following characteristic features:

the transmission interval is greater than or equal to the maximum time period separating the instant of transmission of a frame transmitted by a transmitting subscriber equipment unit from the time instant wherein all of the external input ports of all of the communication nodes have at least received one replica of the frame.

the value of maximum frame size is substantially identical for all the frames to be transmitted and defined for each of the subscriber equipment units.

each identification-authentication credential for a frame to be transmitted is based on an identifier of the subscriber equipment unit that has developed this frame and on the identifier of each of the ports of the subscriber equipment unit that is transmitting the duplicated frame corresponding to this frame and preferably, includes at least some of the characteristic features selected from among the group including at least:

time for development and preparation of this frame;
development sequence number of this frame;
the identifier of a group of frames containing this frame; and
the identifier of the immediate neighbouring communication nodes in the topology of the network.

the identification-authentication credential for a frame to be transmitted additionally also includes an integrity check sequence for checking the integrity of this identification-authentication credential, the said integrity check sequence being based on a redundancy check code for checking the cyclic redundancy of this identification-authentication credential.

the said cyclic redundancy check code is obtained based on a predetermined law for the subscriber equipment unit that has developed the corresponding frame.

each frame is compatible with the format type as per the ARINC 664 (Aeronautical Radio Incorporated).

the said integrity check sequence for checking the integrity of the identification-authentication credential of this frame is initialized based on the MAC address (Media Access Control address) of the subscriber equipment unit that has developed the corresponding frame.

at least one subscriber equipment unit is connected to the corresponding communication node via a plurality of internal input and/or output ports; and the phase of transmission of frames operationally implemented by this subscriber equipment unit includes in addition a step of duplication of each frame to be transmitted so as to create a duplicate frame for each internal input port of the corresponding communication node.

each input condition for a frame received by a communication node via an external and/or internal input port is configurable for this communication node and selected from among the group including at least: conformity with the identification-authentication credentials of this frame; compliance with the limitation on the size of this frame; compliance with the transmission interval of this frame.

the said group additionally also includes the monitoring-checking to ascertain consistency between the result of calculation of a code for cyclic redundancy checking of the identification-authentication credential of this frame based on a predetermined law, and the integrity check sequence contained in this frame, the said predetermined law being dissimilar to the predetermined law for the subscriber equipment unit that has developed the corresponding frame (T).

the input conditions for a frame received by a communication node via an external and/or internal input port also include the prior non-reception by this input port of a frame having at least certain identification-authentication credentials that are identical to those of the frame received.

the output conditions for a frame to be transmitted by a communication node via an external and/or internal output port include the prior non transmission by this output port of a frame having at least some identification-authentication credentials that are identical to those of the frame to be transmitted.

the monitoring-checking of compliance with the input conditions is common for all of the external and/or internal input ports of each communication node.

at least certain input conditions are checked by the corresponding communication node only for the frames entering via an internal input port and originating from the corresponding subscriber equipment unit, or via an external input port and originating from a subscriber equipment unit of a neighbouring communication node.

the communication nodes form at least two distinct and separate communication domains; and each communication domain includes at least one communication node having at least one extra-domain port, with the extra-domain port being an input and/or output port to be used to connect this communication domain to another communication domain.

the input and/or output conditions applied to an extra-domain port are configurable for the corresponding communication node and based on the identification-authentication credentials of frames.

the value of maximum frame size and the transmission interval are configurable in an independent manner in each domain.

The object of the invention also relates to a system for digital data communication for avionics applications including at least:

a communication network constituted of a plurality of communication nodes interconnected to each other by transmission means including physical and/or wireless media in order to transmit the frames and comprising a plurality of external input and/or output ports connecting this node to at least one other node, with at least some of the nodes comprising in addition at least one internal input and/or output port connecting this node to a subscriber equipment unit, each communication node making it possible to transmit the frames originating from one of the external and/or internal input ports to at least one of the external and/or internal output ports;

a plurality of subscriber equipment units, each subscriber equipment unit being connected to a communication node via at least one internal port and capable of transmitting and/or receiving the frames within the and/or originating from the communication network via this communication node. Each subscriber equipment unit includes transmission processing means that are capable of:

limiting the size of each frame to be transmitted by a predetermined value for maximum size;

addition of identification-authentication credentials in each frame to be transmitted in order to develop a duplicate frame; and transmitting the frames to be transmitted with a transmission interval that is predetermined and defined mathematically on the basis of the topology of the network, to at least one internal input port of the corresponding communication node.

Each communication node includes the transmission processing means that are capable of:

monitoring-checking for compliance, of each frame received via an external or internal input port, with the predetermined input conditions;

removing each frame that is not in compliance with the input conditions;

replicating each frame that is in compliance with the input conditions in order to create a replicated frame for each external or internal output port;

monitoring-checking for compliance, of each replicated frame, with the predetermined output conditions;

removing each replicated frame that is not in compliance with the output conditions;

transmitting each replicated frame that is in compliance with the output conditions via the corresponding external or internal output port;

recording and storing of the identification-authentication credential for each frame that is transmitted and compliant with the input conditions and the output conditions.

BRIEF DESCRIPTION OF THE DRAWINGS

The invention will be better understood upon the review of the description that follows, given only by way of an example and with reference being made to the annexed drawings, in which.

DETAILED DESCRIPTION OF THE INVENTION

Figure 1:
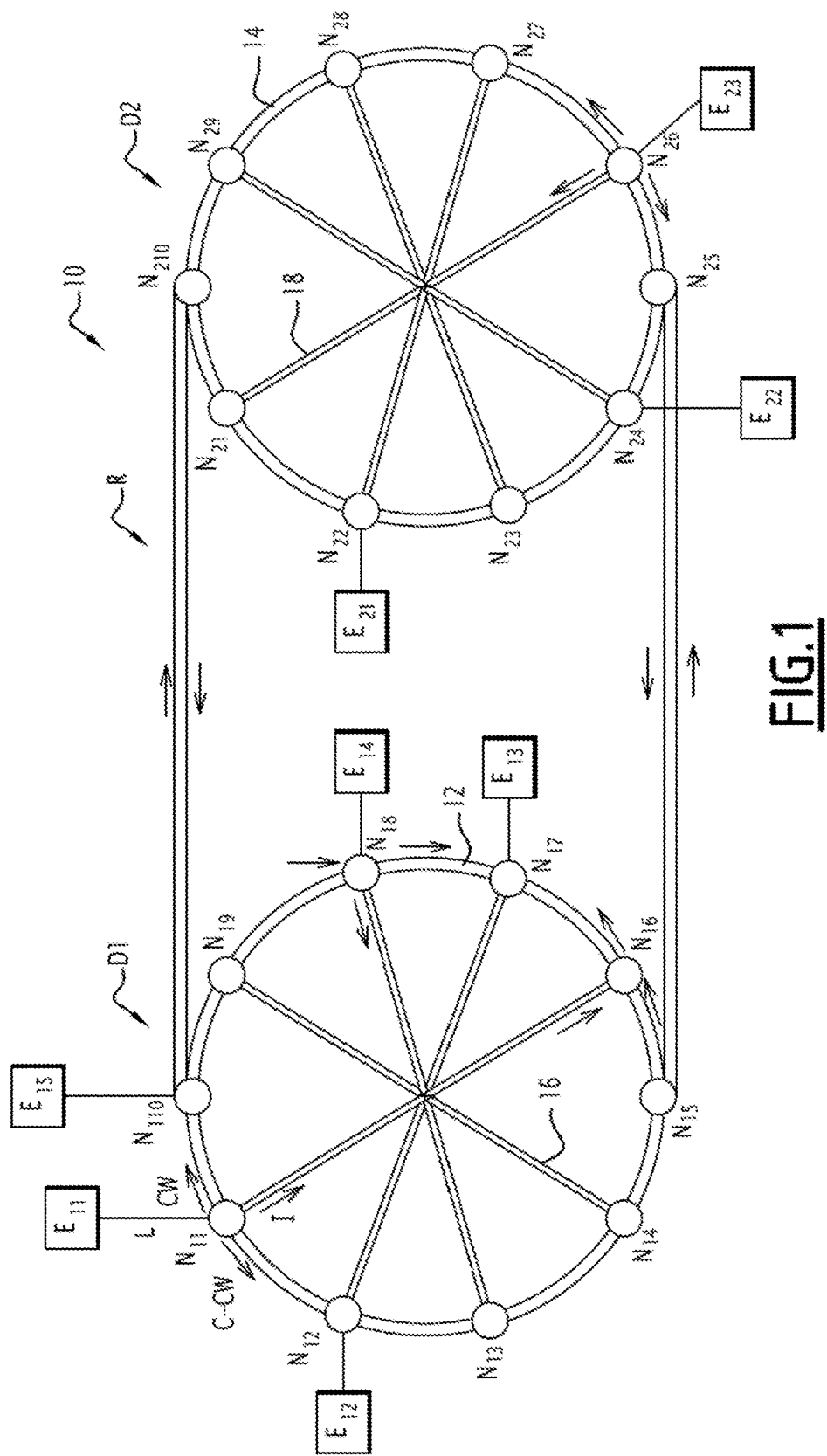
FIG. 1 is a diagram illustrating a communication system according to the invention, the communication system including a communication network comprising of a plurality of communication nodes, and a plurality of subscriber equipment units.

Indeed in FIG. 1, an example of a communication system 10 according to the invention has been illustrated.

This communication system 10 can be used in avionics applications and includes for example a communication network referred to in FIG. 1 by the general reference R.

The communication network R is formed for example of two communication domains that are identified in FIG. 1 by the general identifying references $D_1$ and $D_2$.

Each communication domain $D_1$, $D_2$ consists of a plurality of communication nodes for transmitting the frames, and a plurality of subscriber equipment units that are capable of transmitting and/or receiving the frames within the and/or originating from the communication network R, via at least one communication node.

The format of each frame to be transmitted complies with for example the ARINC 664 standard.

The communication domains $D_1$, $D_2$ are capable of supporting such transmissions of frames having different criticality factors. By way of a variant, the communication domains $D_1$, $D_2$ are distinguished for example by the nature of the subscriber equipment units.

In FIG. 1, the communication nodes of the domain $D_1$ are ten in number and are identified by the general identifying references $N_{1\ 1}$ to $N_{1\ 10}$.

In an analogous manner, the communication nodes of the domain $D_2$ are ten in number and are identified by the general identifying references $N_{2\ 1}$ to $N_{2\ 10}$.

Each communication node $N_{i\ j}$ has for example a network switch. Such a switch as per the English terminology, is also known as "Intermediate System" (expressed literally in French as "système intermédiaire").

In the same FIG. 1, the subscriber equipment units in the domain $D_1$ are four in number and are identified by the general identifying references $E_{11}$ to $E_1$. These equipment units are connected to the communication network R respectively via the nodes $N_{1\ 1}$, $N_{1\ 2}$, $N_{1\ 7}$, $N_{1\ 8}$ and $N_{1\ 10}$.

In an analogous manner, the subscriber equipment units in the domain $D_2$ are three in number and are identified by the general identifying references $E_{2\ 1}$ to $E_{2\ 3}$. These equipment units are connected to the communication network R respectively via the nodes $N_{2\ 1}$, $N_{2\ 2}$ and $N_{2\ 6}$.

Each subscriber equipment unit $E_{i\ j}$ for example has a computing unit or any other avionics equipment connected to the communication network R.

The communication nodes $N_{i\ j}$ of each communication domain $D_1$, $D_2$ are interconnected to each other by way of wireless transmission means and/or physical media in order to ensure the transmission of frames via the network R.

Thus, in FIG. 1, the communication nodes are interconnected to each other by means of a first set of links 12, 14, and by means of a second set of links 16, 18.

The first set of links 12, 14 forms a physical or logical loop based topology as has been illustrated in FIG. 1. Thus, in this topology, each communication node $N_{i\ j}$ is connected to two neighboring nodes along a clockwise and counter-clockwise direction of transmission of frames.

It should nevertheless be understood that this present invention is applicable to any topology for the network R and that FIG. 1 represents only one example of topologies.

The second set of links 16, 18 consists of links that form additional pathways increasing the degree of redundancy in the first set of links 12, 14 in the network R.

Thus, in FIG. 1, the second set of physical links 16, 18 is constituted of intra-loop links that connect at least some nodes $N_{i\ j}$ of the loop to at least another distinct node of each of the neighboring nodes of these nodes $N_{i\ j}$.

Quite obviously, a number of other examples of interconnection of nodes $N_{i\ j}$ with each other within the communication network R by means of links having redundant pathways, are also possible.

Figure 2:
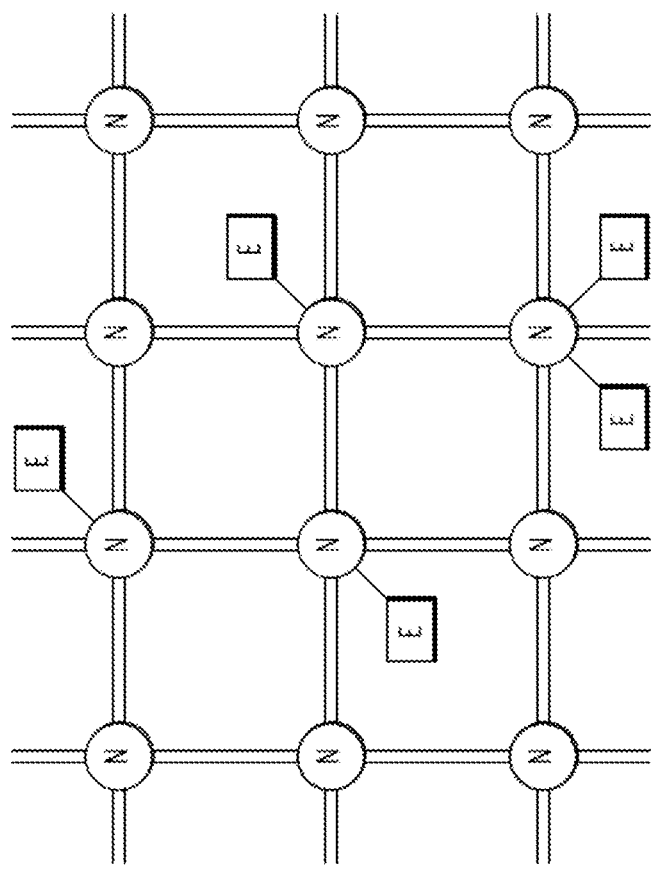
FIG. 2 is a diagram illustrating another example of an embodiment of the network shown in FIG. 1.

For example, it is possible for the interconnection of nodes to have a topology based on so called "mesh networking" (see FIG. 2), in which each node is connected to four neighboring nodes in order to form a mesh.

It is also possible to have a combination of the connection methods cited above.

It is also possible to have a communication network with a number of domains that are different from the one shown in FIG. 1. In addition, these domains may present different topologies.

Figure 3:
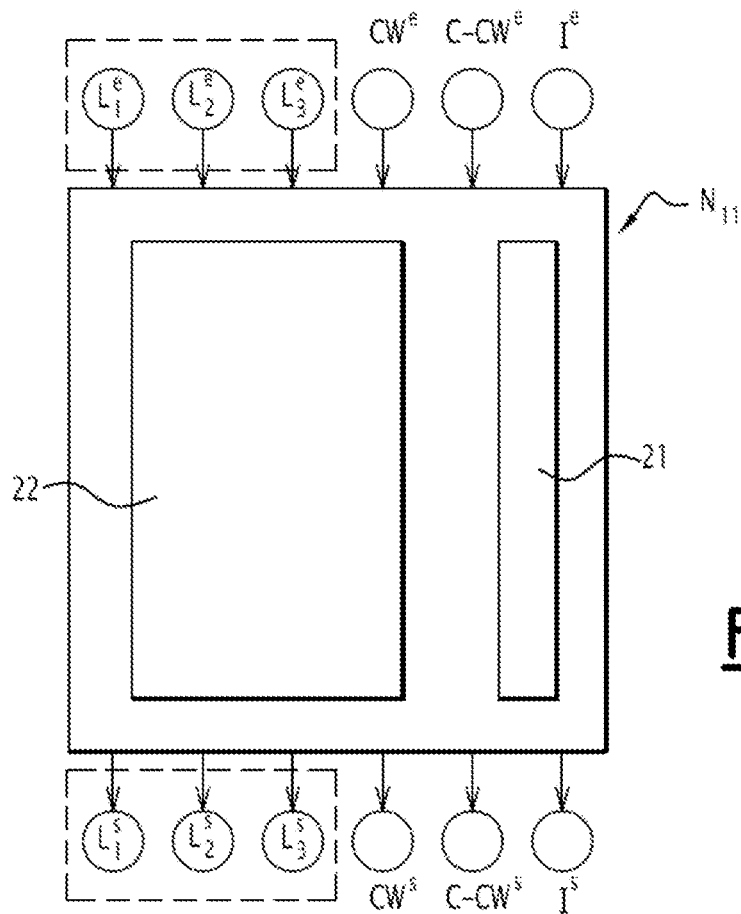
FIG. 3 is a diagram illustrating in detail a communication node shown in FIG. 1.

The structure of a communication node $N_{i,j}$ in the case of the loop network R, for example for the node $N_{1,1}$, is shown more in detail in FIG. 3.

Thus, with reference to FIG. 3, the node $N_{1,1}$ has three internal ports $L_1$ to $L_3$ connecting this node to the subscriber equipment unit $E_{1,1}$, an external port CW connecting this node to the neighbor node $N_{1,10}$ along the clockwise direction of the loop via a link of the first set of links, an external port C-CW connecting this node to the neighbor node $N_{1,2}$ along the counter clockwise direction of the loop via a link of the first set of links, and an external port I connecting this node for example to the node $N_{16}$ via an intra-loop link of the second set of links.

Each internal port $L_1$ to $L_3$ of the communication node $N_{1,1}$ is capable of receiving the frames originating from the subscriber equipment unit $E_{1,1}$ and transmitting the frames originating from the external ports to this equipment unit $E_{1,1}$.

In an analogous manner, each external port of the communication node $N_{1,1}$ is capable of receiving the frames originating from the communication node to which it is connected, and transmitting the frames originating from the other external and/or internal ports of the communication node $N_{1,1}$ to the communication node to which it is connected.

Thus, each internal or external port of the communication node $N_{1,1}$ serves as an input port for the incoming frames entering the node $N_{1,1}$ and as an output port for the outgoing frames exiting the node $N_{1,1}$.

More particularly, in the FIG. 3, the internal input ports are denoted by the identifying references $L_1^e$ to $L_3^e$, the internal output ports are denoted by the identifying references $L_1^s$ to $L_3^s$, the external input ports by the references $CW^e$, $C\text{-}CW^e$ and $I^e$, and the external output ports by the references $CW^s$, $C\text{-}CW^s$ and $I^s$.

Quite obviously, other possibilities for assignment of the input and output functions for the external and/or internal ports of the node $N_{1,1}$ may be considered.

The communication node $N_{1,1}$ in addition includes the memory and storage means and the means for transmission (frame) processing denoted respectively by the general identifying references 21 and 22 in FIG. 3.

The data processing means 22 make it possible to control the transmission of frames via node $N_{1,1}$ and more particularly, operationally implement a transmission phase of $P_2$ for transmitting the frames of the method according to the invention as it will be explained in subsequent sections.

The recording and memory storage means 21 are capable of recording and storing the identification-authentication credentials of each frame received and/or transmitted by the node $N_{1,1}$. In addition, the recording and memory storage means 21 are capable of recording and storing the input port by which this frame is input into the node $N_{1,1}$ and where applicable, the output port through which the frame is output from the node.

The other nodes $N_{i,j}$ of the communication network R have substantially the same structure. However, at least some ports of these nodes $N_{i,j}$ may differ from the ports of the node $N_{1,1}$ described previously.

Thus, for example, each of the nodes $N_{1,10}$, $N_{1,5}$, $N_{2,10}$ and $N_{2,5}$ additionally also includes one external port D for extra-domain connection. These extra-domain connection ports D provide the ability to connect the domains $D_1$ and $D_2$ to each other. On the other hand, these nodes are for example free of any external port I.

The nodes that are not connected to any subscriber equipment unit, such as for example the nodes $N_{1,3}$ or $N_{2,9}$, are for example free of any internal port L.

Figure 4:
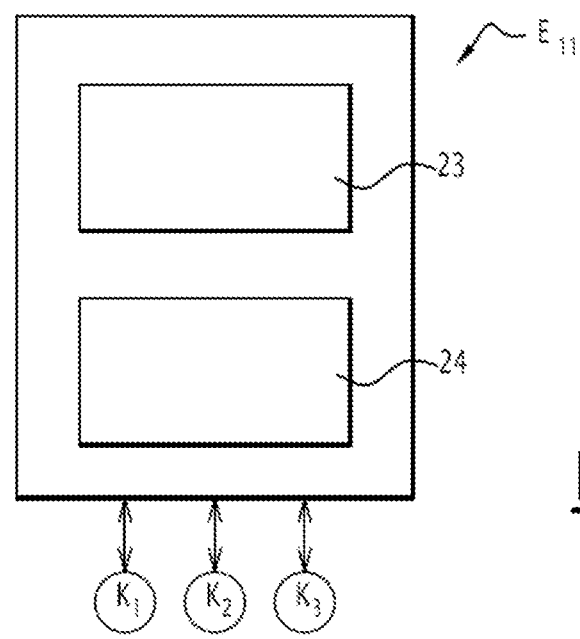
FIG. 4 is a diagram illustrating in detail a subscriber equipment unit as shown in FIG. 1.

The structure of a subscriber equipment unit $E_{i,j}$, for example of the equipment unit $E_{1,1}$ is illustrated in greater detail in FIG. 4. The other subscriber equipment units $E_{i,j}$ of the communication domains $D_1$, $D_2$ have substantially the same structure.

Thus, in reference to this FIG. 4, the equipment unit $E_{1,1}$ includes for example three connection ports $K_1$ to $K_3$ connecting this equipment unit to the node $N_{1,1}$.

Each connection port $K_1$ to $K_3$ serves as an input port for the incoming frames entering the equipment unit $E_{1,1}$ and as an output port for the outgoing frames exiting from the equipment unit $E_{1,1}$.

Quite obviously, the number of connection ports within each subscriber equipment unit $E_{i,j}$ and the assignment of input and output functions for these ports, may vary depending on the nature of the subscriber equipment unit $E_{i,j}$ considered.

The subscriber equipment unit $E_{1,1}$ additionally also includes the means for generation and consumption of frames and the processing means for transmission processing of frames. These means are denoted respectively by the general identifying references 23 and 24 in the FIG. 4.

Thus, the means for generation and consumption of frames 23 are capable of receiving the frames received via the connection ports $K_1$ to $K_3$ and transmitted by other subscriber equipment units $E_{i,j}$ via the communication network R.

The frame generation and consumption means 23 are additionally also capable of transmitting frames to other subscriber equipment units $E_{i,j}$ via the transmission processing means 24 operationally implementing a phase of transmission of frames $P_1$ of the method according to the invention as it will be explained in subsequent sections.

Figure 5:
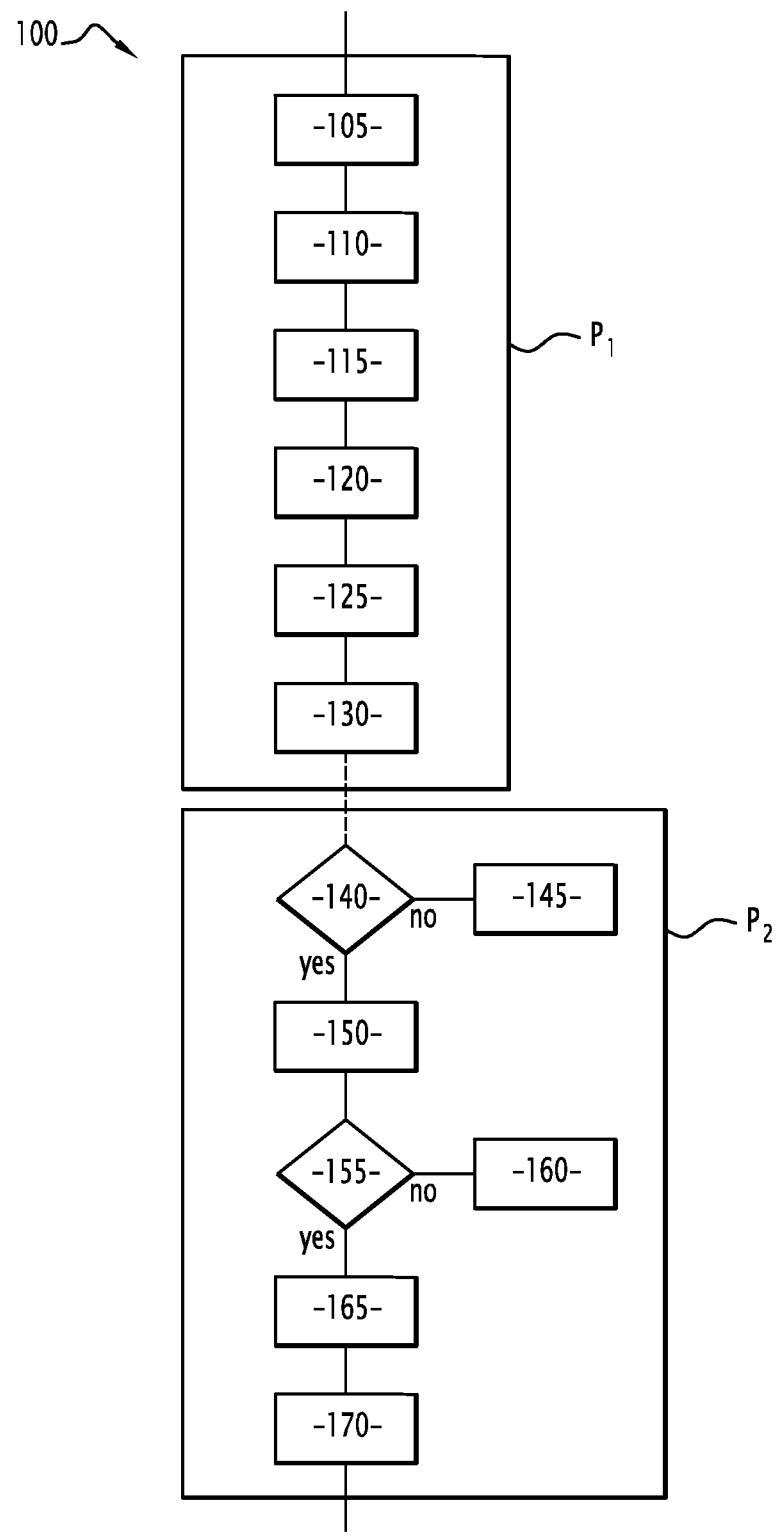
FIG. 5 is a Flowchart illustrating the main steps of the method according to the invention.

The method 100 for exchange of digital data frames according to the invention will now be described with reference to FIG. 5 which represents a process flow chart of the main steps thereof.

This method is based on the method of controlled frame flooding or "controlled flooding" as per the accepted English terminology, consisting of creating replicas of each frame to be transmitted and controlling the propagation of these replica according to some simple laws.

Thus, during the phase of transmission of frames $P_1$, a subscriber equipment unit $E_{i,j}$, for example the equipment unit $E_{1,1}$, transmits the frames over the communication network R. This transmission phase $P_1$ comprises several steps described here below.

During the initial step 105, the frame generation and consumption means 23 of the equipment unit $E_{1,1}$ produce at least one frame T to be transmitted.

During the subsequent step 110, the transmission processing means 24 of the equipment unit $E_{1,1}$ limits the size of the frame T to be transmitted by means of a maximum size value predetermined for this equipment unit.

This maximum size value for example is substantially identical for all of the frames to be transmitted by the same equipment unit $E_{1,1}$ and is for example defined independently for each of the subscriber equipment units $E_{i,j}$.

By way of a variant, the maximum size value is common to all of the subscriber equipment units $E_{i,j}$ of the same communication domain $D_1$, $D_2$, or in a more global sense of the network R.

During the subsequent step 115, the transmission processing means 24 of the equipment unit $E_{1\,1}$ determine the time elapsed after the transmission of a preceding frame by the equipment unit $E_{1\,1}$.

If the determined value is less than that of a predetermined transmission interval, the processing means 22 delay the transmission of the frame T and determine the time elapsed after the transmission of the preceding frame until such time as the determined value becomes greater than or equal to the predetermined transmission interval.

This predetermined transmission interval or minimal distance between successive frame transmissions also known by the term 'Maximum Access Frame Rate' as per accepted English terminology, is for example mathematically defined on the basis of the topology of the network R.

Thus, for example, the transmission interval is greater than or equal to the maximal time period separating the time instant of transmission of a frame T transmitted by a subscriber equipment unit $E_{i,j}$ from the maximum of the time instants from a set of time instants of reception.

Each element of this set (or time instant of reception) corresponds to the time instant of reception of the first replica of this frame T for a given port of a communication node $N_{i,j}$ of the communication domain $D_i$ corresponding to the subscriber equipment unit $E_{i,j}$ that has transmitted the frame. This set therefore is constituted of as many elements as there are input ports in the corresponding domain (that is to say, the total number of input ports for all of the nodes $N_{i,j}$ of the corresponding domain).

By way of a variant, the transmission interval is greater than or equal to the maximal time period separating the time instant of transmission of a frame T transmitted by a subscriber equipment unit $E_{i,j}$ from the maximum of the time instants from a set of time instants of reception.

Each element of this set (or time instant of reception) corresponds to the time instant of reception of the first replica of this frame T for a given input port of a communication node of the network R. This set therefore is constituted of as many elements as there are input ports in the communication network R (that is to say, the total number of input ports for all of the nodes $N_{i,j}$ of the corresponding domain).

The transmission interval for example is substantially identical for all the frames to be transmitted by the same equipment unit $E_{1\,1}$ and is for example defined independently for each of the subscriber equipment units $E_{i,j}$.

By way of a variant, the transmission interval is common for all of the subscriber equipment units $E_{i,j}$ of the same communication domain $D_1$, $D_2$, or in a more global sense of the network R.

During the subsequent step 120, the transmission processing means 24 duplicate the frame to be transmitted T in order to create a duplicate frame $T_i$ for each connection port $K_1$ to $K_3$ from this equipment unit $E_{1\,1}$ to the node $N_{1\,1}$.

The duplicate frame $T_i$ is for example strictly identical to the frame T except for the field "Identifier of each of the connection ports (for example K1 to K3) of the subscriber equipment unit that has transmitted this frame" and therefore excepting the control coding for checking of the identification-authentication credentials.

During the subsequent step 125, the transmission processing means 24 add the identification-authentication credentials in each duplicate frame $T_i$.

Thus, for example, the identification-authentication credentials are added in the header of each duplicated frame $T_i$ and make it possible to identify this frame $T_i$ in a unique way in the network R.

In addition, this information provides the ability for example to identify all of the duplications $T_i$ corresponding to the frame T transmitted.

Each identification-authentication credential is based for example on an identifier of the subscriber equipment unit that has developed this frame. In the case of the equipment unit $E_{1\,1}$, each identification-authentication credential is therefore based on its identifier, such as its MAC address (Media Access Control address), for example.

In addition, each identification-authentication credential may include at least some of the characteristic features selected from the group including at least:

time period of development of the corresponding frame T;

development sequence number of the corresponding frame T;

identifier of a group of frames containing the corresponding frame T;

identifier of each of the connection ports (for example $K_1$ to $K_3$) of the subscriber equipment unit that has transmitted this frame.

In addition, at least certain identification-authentication credentials may include an integrity check sequence for checking the integrity of this identification-authentication credential such as for example a code for cyclic redundancy checking CRC of this identification-authentication credential.

The sequence for checking the integrity of the identification-authentication credential may for example be initialized based on the MAC address of the equipment unit $E_{1\,1}$.

Thus, the header or at least a part corresponding to the identification-authentication credentials added in each frame $T_i$ the format of which is in conformity with the relevant standard of such type as the ARINC 664, may take the following form:

| Bits | Content |
| --- | --- |
| [47-46] | Data of the type "unicast, locally administrated". |
| [45-28] | Data of the type "xmit dating" |
| [27-14] | The code for cyclic redundancy check CRC for the identification - authentication credential |
| [13-8] | Identifier of the equipment unit that has developed this frame |
| [7-0] | Identifier of each of the connection ports (for example $K_1$ to $K_3$) of the subscriber equipment unit that has transmitted this frame |

During the final step 130 of the transmission phase $P_1$, the processing means 24 transmit each duplicate frame $T_i$ over the network R via the corresponding connection port $K_1$ to $K_3$.

Quite obviously, the implementation of the transmission phase $P_1$ by the other subscribers equipment units $E_{i,j}$ is similar to that described here above taking into account a certain number of differences, like for example the number of connection ports in this equipment unit $E_{i,j}$ or even the communication node through which it is connected to the network R.

During the phase of transmission of frames $P_2$, a node $N_{i,j}$, for example the node $N_{1\,1}$, receives at least one frame $T_i$ or $T_{i,j}$ to be transmitted originating from one of its input ports. Such an input port corresponds for example to one of its internal ports $L_1$ to $L_3$ of the node $N_{1\,1}$, or indeed to one of the external ports C-CW, CW or I.

During the initial step 140, the transmission processing means 22 of the node $N_{1\,1}$ checks the frame $T_i$ or $T_{i,j}$ received via the corresponding input port, to ascertain compliance thereof with the predetermined input conditions.

Each input condition is configurable for example in an independent manner for each node $N_{i,j}$ or common for all the nodes $N_{i,j}$ forming the same communication domain $D_1$, $D_2$, or common to all of the nodes $N_{i,j}$ of the network R.

Each input condition is selected for example from among the group that includes at least:
- conformity with the identification-authentication credentials of the frame $T_i$ or $T_{i,j}$;
- compliance with the limitation on the size of the frame $T_i$ or $T_{i,j}$;
- compliance with the transmission interval of the frame $T_i$ or $T_{i,j}$.
- reception of each frame (internal port or external port of each communication node): monitoring-checking to ascertain consistency between the result (OK or NOK) of the CRC testing applied to the identification-authentication credential of the frame thereby allowing for the identification of the source equipment unit and the field of the frame containing the identification of the source equipment.

The input conditions additionally also include the prior non-reception by the corresponding input port of another frame having at least certain identification-authentication credentials that are identical to those of the frame received $T_i$ or $T_{i,j}$.

In other words, the input conditions have not been fulfilled if at least some identification-authentication credentials of the frame $T_i$ or $T_{i,j}$ are contained in the recording and storage means 21 for the corresponding port.

The check of compliance with the input conditions of the frame $T_i$ or $T_{i,j}$ is for example carried out by the processing means 22 depending on the nature of its input port.

It is thus possible to have for example, different controls for the internal input ports and for the external input ports.

By way of a variant, the check of compliance with the input conditions is common for all of the input ports of the communication node $N_{1,1}$.

In addition, the check of the identifier of the subscriber equipment unit $E_{i,j}$ that has transmitted the frame $T_i$, wherein this identifier is included in the identification-authentication credentials of this frame $T_i$, may be carried out on the basis of a law that is predefined and known, for assigning of each identifier of the subscriber equipment unit $E_{i,j}$ to the communication network R.

This law must be consistent in terms of the results, but may be dissimilar from the law, in itself predefined and known, based on which the identifier of the subscriber equipment unit $E_{i,j}$ has been developed. For example this dissimilarity may be applicable in respect of the law itself and/or of the associated algorithm in a manner so as to improve the overall integrity of the system.

In addition, the checking of the control code for cyclic redundancy check CRC of the identification-authentication credential of the subscriber equipment unit $E_{i,j}$ that has transmitted the frame $T_i$, this control code being included in the identification-authentication credentials of this frame $T_i$, may be carried out on the basis of a law that is predefined and known, for assigning of each identifier of the subscriber equipment unit $E_{i,j}$ to the communication network R.

By way of yet another variant or in addition thereto, at least certain input conditions are controlled and checked by the corresponding communication node $N_{i,j}$ only for the frames entering via an internal input port and originating from the corresponding subscriber equipment unit $E_{i,j}$, or via an external input port and originating from the subscriber equipment unit $E_{i,j}$ of a neighboring communication node.

With reference to FIG. 1, this signifies that at least some input conditions are controlled by the communication node $N_{1,1}$ only for the frames entering via one of the internal ports $L_1$ to $L_3$, or via the external port C-CW and originating from the subscriber equipment unit $E_{1,2}$.

If at least one of the abovementioned input conditions have not been satisfied, the processing means 22 remove the frame $T_i$ or $T_{i,j}$ during the step 145.

If the entire set of input conditions has been satisfied, the processing means 22 replicate the frame $T_i$ or $T_{i,j}$ in order to create a replicated frame $T_{i,j}$ (strictly identical to $T_i$ or $T_{i,j}$) for each external or internal output port of the node $N_{1,1}$, during the step 150.

During the same step 150, the processing means 22 transmit each frame to the corresponding internal or external output port. Such a transmission is systematic within each communication node $N_{i,j}$.

During the step 155, the processing means 22 check each replicated frame $T_{i,j}$ to ascertain compliance thereof with the predetermined output conditions, for the corresponding output port.

The output conditions for each replicated frame $T_{i,j}$ include in particular the prior non transmission in advance of another frame having at least some identification-authentication credentials that are identical to those of the replicated frame $T_{i,j}$.

In other words, the output conditions have not been satisfied if at least some identification-authentication credentials of the frame $T_{i,j}$ are contained in the recording and memory storage means 21 for the corresponding output port.

If the output conditions have not been satisfied, the processing means 22 will remove the replicated frame $T_{i,j}$ during the step 160.

If the output conditions have been satisfied, the replicated frame $T_{i,j}$ is transmitted to the corresponding output port during the step 165.

During the step 170, the recording and memory storage means 21 record and store the identification-authentication credentials of each frame $T_{i,j}$ that has been transmitted and is compliant with the input conditions and the output conditions. The recording and memory storage means 21 also record and store the ports through which the frame $T_i$ has been transmitted.

Quite obviously, the implementation of the transmission phase $P_2$ by the other nodes $N_{i,j}$ is analogous to that described here above.

However, there could be a difference in carrying out the processing of the frames by the processing means 22 for example, for the nodes comprising the extra-domain connection ports D, like for example, for the nodes $N_{1,10}$, $N_{1,5}$, $N_{2,10}$ and $N_{2,5}$.

Thus, for example, the input and/or output conditions applied to an extra-domain port D may be configured in an independent manner by the corresponding communication node $N_{i,j}$ and based for example on the identification-authentication credentials of frames.

These conditions may more particularly verify the criticality related conditions of the frames transmitted from one of the domains $D_1$, $D_2$ to the other.

It may be conceived then that the present invention includes a certain number of advantages.

The exchange method according to the invention makes it possible to ensure the management of exchange of frames via a multiplicity of different pathways (therefore redundancy of pathways) or <<poly-links>> thereby increasing the degree of availability and integrity of the communications network in a particularly simple and robust manner.

This method offers a controlled systematic approach with a simple law that is predefined and non-configurable.

The method is easily adaptable to any communication network topology and offers a high level of monitoring of frame exchange and of non-propagation of erroneous frames.

The invention claimed is:

1. A frame exchange method for exchanging digital data frames in a data communication system for communicating digital data for avionics applications including at least:
   a communication network constituted of a plurality of communication nodes interconnected to each other by transmission means including physical and/or wireless support in order to transmit the frames and comprising a plurality of external input and/or output ports connecting each node to at least one other node, at least some of the nodes comprising in addition at least one internal input and/or output port connecting this node to a subscriber equipment unit, each communication node making it possible to transmit the frames originating from one of the external and/or internal input ports to at least one of the external and/or internal output ports; and
   a plurality of subscriber equipment units, each subscriber equipment unit being connected to a communication node via at least one internal port and capable of transmitting and/or receiving the frames within the and/or originating from the communication network via this communication node, wherein each subscriber equipment unit includes a plurality of connection ports connecting this equipment to the corresponding node;
   wherein the method comprises at least one transmission phase for transmitting of frames operationally implemented by at least one subscriber equipment unit and including the following steps:
   limiting the size of each frame to be transmitted by a predetermined value for maximum size;
   duplicating each frame to be transmitted in order to create a duplicate frame for each connection port of the corresponding subscriber equipment unit;
   adding identification-authentication credentials in each frame to be transmitted; and
   transmitting the frames to be transmitted with a transmission interval that is predetermined and defined mathematically on the basis of the topology of the network, to at least one internal input port of the corresponding communication node; and
   having a transmission phase for transmitting of frames operationally implemented by at least one communication node and including the following steps:
   monitoring-checking for compliance, of each frame received via an external or internal input port, with the predetermined input conditions;
   removing each frame that is not in compliance with the input conditions;
   replicating each frame that is in compliance with the input conditions in order to create a replicated frame for each external or internal output port;
   monitoring-checking for compliance, of each replicated frame, with the predetermined output conditions;
   removing each replicated frame that is not in compliance with the output conditions;
   having transmission of each replicated frame that is in compliance with the output conditions via the corresponding external or internal output port; and
   recording and storing of the identification-authentication credential for each frame that is transmitted and compliant with the input conditions and the output conditions,
   wherein the communication nodes form at least two distinct and separate communication domains,
   wherein each communication domain includes at least one communication node having at least one extra-domain port, with the extra-domain port being an input and/or output port to be used to connect this communication domain to another communication domain, and
   wherein the value of maximum frame size and the transmission interval are configurable in an independent manner in each domain.

2. The method according to claim 1, wherein the transmission interval is greater than or equal to the maximum time period separating the instant of transmission of a frame transmitted by a transmitting subscriber equipment unit from the time instant wherein all of the external input ports of all of the communication nodes have at least received one replica of the frame.

3. The method according to claim 1, wherein the value of maximum frame size is identical for all the frames to be transmitted and defined for each of the subscriber equipment units.

4. The method according to claim 1, wherein each identification—authentication credential for a frame to be transmitted is based on an identifier of the subscriber equipment unit that has developed this frame and on the identifier of each of the ports of the subscriber equipment unit that is transmitting the duplicated frame corresponding to this frame and preferably, includes at least some of the characteristic features selected from the group consisting of at least:
   time for development and preparation of this frame;
   development sequence number of this frame;
   the identifier of a group of frames containing this frame; and
   the identifier of the immediate neighboring communication nodes in the topology of the network.

5. The method according to claim 4, wherein the identification-authentication credential for a frame to be transmitted additionally also includes an integrity check sequence for checking the integrity of this identification-authentication credential, the integrity check sequence being based on a redundancy check code for performing the cyclic redundancy check of this identification-authentication credential.

6. The method according to claim 5, wherein the cyclic redundancy check code is obtained based on a predetermined law for the subscriber equipment unit that has developed the corresponding frame.

7. The method according to claim 1, wherein each frame is compatible with the format type as per the ARINC 664.

8. The method according to claim 6, wherein the integrity check sequence for checking the integrity of the identification-authentication credential of this frame is initialized based on the MAC address (Media Access Control address) of the subscriber equipment unit that has developed the corresponding frame.

9. The method according to claim 1, wherein:
   at least one subscriber equipment unit is connected to the corresponding communication node via a plurality of internal input and/or output ports; and
   the phase of transmission of frames operationally implemented by this subscriber equipment unit includes in addition a step of duplication of each frame to be transmitted so as to create a duplicate frame for each internal input port of the corresponding communication node.

10. The method according to claim 1, wherein each input condition for a frame received by a communication node via an external and/or internal input port is configurable for this communication node and selected from among the group at least:
conformity with the identification-authentication credentials of this frame;
compliance with the limitation on the size of this frame;
compliance with the transmission interval of this frame.

11. The method according to claim 10, wherein
the cyclic redundancy check code is obtained based on a predetermined law for the subscriber equipment unit that has developed the corresponding frame, and
the group additionally also includes the monitoring-checking to ascertain consistency between the result of calculation of a code for cyclic redundancy checking of the identification-authentication credential of this frame based on a predetermined law, and the integrity check sequence contained in this frame, the predetermined law being dissimilar to the predetermined law for the subscriber equipment unit that has developed the corresponding frame.

12. The method according to claim 1, wherein the input conditions for a frame received by a communication node via an external and/or internal input port also include the prior non-reception by this input port of a frame having at least certain identification-authentication credentials that are identical to those of the frame received.

13. The method according to claim 1, wherein the output conditions for a frame to be transmitted by a communication node via an external and/or internal output port include the prior non transmission by this output port of a frame having at least some identification-authentication credentials that are identical to those of the frame to be transmitted.

14. The method according to claim 1, wherein the monitoring-checking of compliance with the input conditions is common for all of the external and/or internal input ports of each communication node.

15. The method according to claim 1, wherein at least certain input conditions are checked by the corresponding communication node only for the frames entering via an internal input port and originating from the corresponding subscriber equipment unit, or via an external input port and originating from a subscriber equipment unit of a neighboring communication node.

16. The method according to claim 1, wherein the input and/or output conditions applied to an extra-domain port are configurable for the corresponding communication node and based on the identification-authentication credentials of frames.

17. A frame exchange system for exchanging frames of digital data in a digital data communication system for avionics applications including at least:
a communication network constituted of a plurality of communication nodes interconnected to each other by transmission means including physical and/or wireless support in order to transmit the frames and comprising a plurality of external input and/or output ports connecting each node to at least one other node, at least some of the nodes comprising in addition at least one internal input and/or output port connecting this node to a subscriber equipment unit, each communication node making it possible to transmit the frames originating from one of the external and/or internal input ports to at least one of the external and/or internal output ports; and
a plurality of subscriber equipment units, each subscriber equipment unit being connected to a communication node via at least one internal port and capable of transmitting and/or receiving the frames within the and/or originating from the communication network via this communication node;
wherein in that each subscriber equipment unit includes transmission processing means that are capable of:
limiting the size of each frame to be transmitted by a predetermined maximum size value;
duplicating each frame to be transmitted in order to create a duplicate frame for each connection port of the corresponding subscriber equipment unit;
adding identification-authentication credentials in each frame to be transmitted; and
transmitting the frames to be transmitted with a transmission interval that is predetermined and defined mathematically on the basis of the topology of the network, to at least one internal input port of the corresponding communication node; and
wherein each communication node includes the transmission processing means that are capable of:
monitoring-checking for compliance, of each frame received via an external or internal input port, with the predetermined input conditions;
removing each frame that is not in compliance with the input conditions;
replicating each frame that is in compliance with the input conditions in order to create a replicated frame for each external or internal output port;
monitoring-checking for compliance, of each replicated frame, with the predetermined output conditions;
removing each replicated frame that is not in compliance with the output conditions;
transmitting each replicated frame that is in compliance with the output conditions via the corresponding external or internal output port; and
recording and storing the identification-authentication credential for each frame that is transmitted and compliant with the input conditions and the output conditions,
wherein the communication nodes form at least two distinct and separate communication domains,
wherein each communication domain includes at least one communication node having at least one extra-domain port, with the extra-domain port being an input and/or output port to be used to connect this communication domain to another communication domain, and
wherein the value of maximum frame size and the transmission interval are configurable in an independent manner in each domain.

* * * * *